US005577522A

United States Patent [19]
Barkley et al.

[11] Patent Number: 5,577,522
[45] Date of Patent: Nov. 26, 1996

[54] TRANSPORTABLE, ELECTRONICALLY CONTROLLED SYSTEM FOR ON-SITE DECONTAMINATION OF SOLID AND HAZARDOUS WASTE

[75] Inventors: Naomi P. Barkley; Majid A. Dosani, both of Cincinnati, Ohio; Donald E. Sanning, Villa Hills, Ky.; Michael L. Taylor, Cincinnati, Ohio

[73] Assignees: United States of America, Washington, D.C.; IT Corporation, Torrance, Calif.

[21] Appl. No.: 358,103

[22] Filed: Dec. 16, 1994

[51] Int. Cl.$^6$ ...................................... B08B 3/04
[52] U.S. Cl. .................. 134/111; 134/153; 134/148; 134/142; 134/123
[58] Field of Search ...................... 134/111, 142, 134/141, 144, 148, 153, 155, 159, 123

[56] References Cited

U.S. PATENT DOCUMENTS

| | | | |
|---|---|---|---|
| 2,510,826 | 6/1950 | Lillevick | 134/153 |
| 3,323,528 | 6/1967 | Link | 134/153 |
| 3,841,909 | 10/1974 | Nonaka et al. | 134/153 |
| 3,853,622 | 10/1974 | Rutten | 134/153 |
| 3,855,118 | 12/1974 | Mikolajczyk | 134/153 |
| 4,103,520 | 8/1978 | Jarvis et al. | 68/207 |
| 4,236,541 | 12/1980 | Cipriani | 134/153 |
| 4,682,613 | 7/1987 | DeLoach | 134/159 |
| 5,139,039 | 8/1992 | Yates | 134/153 |
| 5,299,587 | 4/1994 | Randall et al. | 134/159 |
| 5,421,883 | 6/1995 | Bowden | 134/159 |
| 5,437,296 | 8/1995 | Citino | 134/153 |

Primary Examiner—Frankie L. Stinson
Attorney, Agent, or Firm—Browdy & Neimark

[57] ABSTRACT

A debris cleaning apparatus leaning for toxic waste sites is mounted on a trailer. The apparatus includes a chamber and a crane that lowers a basket drum, filled with contaminated debris, into the chamber. The drum is cylindrical and has journal shafts at either end which drop into bearings in the chamber. The drum can be coupled to a drive motor to rotate the drum during a washing operation in which the chamber is filled with heated detergent solution and agitated. The drum surface is perforated. The agitation is increased by pumping the detergent into eductors inside the chamber, each eductor including a nozzle and a venturi concentric with the nozzle; the jet entrains large amounts of detergent to create a high-volume turbulent flow inside the chamber. The chamber is then drained into a holding tank and the debris is sprayed with detergent from orifices drilled through the drum walls. The orifices are fed by headers and a manifold welded to the outside of the drum and supplied with detergent through a hollow pipe shaft. The pipe includes a clutch which turns the basket drum. After spraying with detergent the debris is sprayed with rinse water. A conditioning system removes pollutants from the detergent during the cleaning operation, using an oil/water separator, a carbon filter, an ion exchange resin column, and a particulate filter. A boiler automatically keeps the detergent warm. The cleaning cycle may be automated.

11 Claims, 4 Drawing Sheets

TRANSPORTABLE, ELECTRONICALLY CONTROLLED SYSTEM FOR ON-SITE DECONTAMINATION OF SOLID AND HAZARDOUS WASTE

BACKGROUND OF THE INVENTION

1. Field of the Invention

The present invention relates to portable cleaning systems for on-site cleanup, especially for cleaning debris at toxic waste sites.

2. Description of the Related Background Art

Equipment to clean up a toxic waste site preferably should have several characteristics. First, it should be portable, and preferably should be able to be loaded and unloaded from standard truck trailers, or else built onto a truck bed or trailer.

Second, it should effectively surface clean debris such as 55-gallon drums, machinery, bricks, plastic, or rocks. It should remove organic chemical pollutants such as PCB, DDT, lindane, or lead, mercury, or other metals and metal compounds, which are dissolved in oily surface films or bonded to solids by hydrocarbon contamination.

Third, the cleaning system and equipment should not generate polluted residue in any great quantities, as this would destroy the purpose of cleaning up the toxic waste.

Several prior-art devices are known for cleaning drums, metal parts, etc, but none of these matches the capabilities of the present invention.

Commercially-available drum washing equipment and commercial beverage can washers are not available as trailer mounted units, and cannot cope with the large amounts of soil and mud mixed with the debris at a typical toxic waste site.

Hand-held, high-pressure water lasers are portable and are not easily clogged, but are not safe and generate large amounts of residue-containing wash water.

Degreasers are not environmentally safe, are not rugged enough, and generate a great deal of residue.

Steam cleaning equipment is dangerous to operate and generates residues.

Freon spray-wash equipment has all the drawbacks of the others, except that it is transportable.

A portion of a paper by M. L. Taylor, M. A. Dosani, and J. A. Wentz, et al, described a field demonstration of a device related to the present invention, was presented at the Second Forum on Innovative Hazardous Waste Treatment Technologies in Philadelphia, Pa. in May 1990.

An Abstract, Attachment C, was published in the Proceedings of the 18th Annual RREL Research Symposium, EPA/606/R-92/028, April 1992. The authors are listed as Michael L. Taylor, Majid A. Dosani, and John A. Wentz, Avinish N. Patkar, and Naomi P. Barkley.

Attachment D of the paper is entitled Transportable Debris Washing System: Field Demonstration Results and Status of Full-Scale Design, by Michael L. Taylor, Majid A. Dosani, and John A. Wentz, and Avinish N. Patkar of IT Corp., and Naomi P. Barkley and Charles Eger of the EPA. This was presented at the Third Forum on Innovative Hazardous Waste Treatment Technologies: Domestic and International, held in Dallas, Tex. on Jun. 11–13, 1991.

An Abstract was published in the Proceedings of the 18th Annual RREL Research Symposium, EPA/606/R-92/028, April 1992. The authors are listed as Michael L. Taylor, Majid A. Dosani, and John A. Wentz, Avinish N. Patkar, and Naomi P. Barkley.

The attachments C and D describe the choice of BG5 as a non-ionic, non-toxic, low-foaming surfactant following bench trials of various surfactants by high-pressure spray, turbulent wash tank immersion, and air-drying. Surface wipe tests, before and after the wash and spray, were used to evaluate the surfactants.

As disclosed in the attachments, a pilot-scale test device was constructed which was disclosed to have a 300-gallon spray tank, a 300-gallon wash tank, a surfactant holding tank, and rinse water holding tank, an oil/water separator, and a solution-treatment system with diatomaceous earth filter, activated carbon column, and an ion-exchange column.

The spent surfactant and rinse water were treated after the debris clean-up in a water treatment system that removed the pollutants.

The attachment C describes the plan to use a heavy duty basket drum lifted by crane into a tank, immersion in "high-turbulence" washing solution, and tumbling action. It also discloses a continuous water treatment system for cleaning during the debris cleaning operation, and a heating system. Attachment D describes an oil/water separator and rotating basket drum, a single wash/spray/rinse chamber, and semi-automatic operation. It discloses plans to use an "innovative system" to "directly impact" detergent spray onto the debris, but it does not disclose any specifics of that system. No details of the spray system contemplated by the inventors were disclosed.

A paper entitled "Field Experience With a Full-Scale Debris-Washing Process" was presented at the Air and Waste Management Association's 87th Annual Meeting and Exhibition, Jun. 19–24, 1994, Cincinnati, Ohio, by authors Michael L. Taylor and Majid A. Dosani of the IT Corporation, Cincinnati, Ohio and Naomi P. Barkley and Donald E. Sanning of the U.S. Environmental Protection Agency, Risk Reduction Engineering Laboratory, Cincinnati, Ohio.

An article entitled "Field experience with a full-scale debris-washing process" was published by *Computer Methods and Advances in Geomechanics*, Siriwardane & Zaman (eds), 1994 Balkema, Rotterdam, ISBN 90 5410 380 9. The authors listed are M. L. Taylor, M. A. Dosani and H. Davidson of IT Corporation, Cincinnati, Ohio and Pittsburgh, Pa., USA.

SUMMARY OF THE INVENTION

The main wash system is fitted onto a single flat bed type trailer, 48 feet long. At the rear end is a crane, and immediately adjacent the crane is a cleaning chamber. Also on the trailer are holding tanks for washing detergent and rinse water, a boiler to heat the detergent and water, and pumps, pipes, and auxiliary equipment.

The debris is loaded into a cylindrical basket drum with sides and ends of 1-inch screen mesh construction, so that water can easily run through the basket drum sides. The basket drum includes a door for placing debris into the basket drum and removing it. The basket drum is mountable inside the cleaning chamber. Journal shafts, at either end of the basket drum, fit into bearings in the chamber. The crane may be used to lift the basket drum into the chamber and remove it.

In a first washing operation, the chamber is filled with a detergent mixture of water and Bluegold or BG5 (a non-ionic surfactant) at 3–8% concentration. A centrifugal pump is used to agitate detergent inside the chamber while the basket drum rotates at 1–5 rpm.

One of the basket drum journal shafts includes a sprocket wheel, driven by a hydraulic motor, for rotating the basket drum during the cleaning operations. The purpose of rotating the basket drum is to continuously re-orient the debris within the basket. Turbulence in the wash water is needed, as well as basket rotation, to insure that all the surfaces of the debris pieces are evenly cleaned. To maximize the turbulence without the need for large pipes and pumps, the invention uses eductors deployed at various places inside the chamber. Eductors use a nozzle jetting through a venturi to multiply the flow of liquid.

Following the wash, and while still in the basket drum mounted in the chamber, the debris is sprayed with detergent and rinsed with water. High-pressure detergent spray is directed onto the debris from orifices on the inside of the basket drum. This prevents the mesh sides of the basket drum from interfering with the detergent sprays, as would happen if the spray orifices were outside of the basket drum. To feed high-pressure detergent to the orifices inside the drum, one of the journal shafts is made hollow and is connected at the inboard end to radiating manifold tubes, formed of sheet metal welded to the basket drum surface. The manifold tubes bend at the basket drum corner to run along the outside surface of the basket drum as headers. The orifices are drilled through-holes that communicate between the header and the inside of the basket drum.

A special connection, including a fluid-sealing clutch, is employed between the hollow journal shaft and the delivery pipe from the spray pump. The connection includes retractable clutch jaws for rotating the basket drum and a rotary pressure-sealing pipe joint.

After the spray, the debris is rinsed in clean water using the same headers and orifices as were used for spraying.

To prevent large quantities of dirty water from accumulating, during the washing operation the surfactant and water are pumped through a closed-loop conditioning system which consists of an oil/water separator, carbon filters, ion exchange resin columns, and particulate filters. This closed-loop conditioning system is mounted onto a second 48-foot long flat bed trailer.

Sludge or soil that accumulates in the bottom of the chamber is removed by a trash pump. A boiler is provided to maintain the detergent and water temperature at 140°–160° F. The boiler is automatically fired when needed. A control panel may optionally include automatic or semi-automatic cycling and control.

DETAILED DESCRIPTION OF THE PREFERRED EMBODIMENTS

Here, and in the following claims, the following definitions apply:

"eductor" means a fluid discharge device, having no moving parts, which entrains ambient fluid to multiply discharge flow; and "detergent" means a mixture of water and detergent or other surfactant or cleaning material, or other aqueous solutions and suspensions of cleaning reagents.

The present invention is a debris washing system for cleaning contaminated objects ranging in size from 1 inch in diameter up to several feet across. The main use of the invention is washing contaminated debris at toxic waste sites. The invention is portable for sequential use at different sites, and is permanently mounted on one or more 48-foot semi-truck trailers for convenient transportation to waste sites. Parts of the invention may be set on a concrete pad at a site for semi-permanent use.

Figure 1:
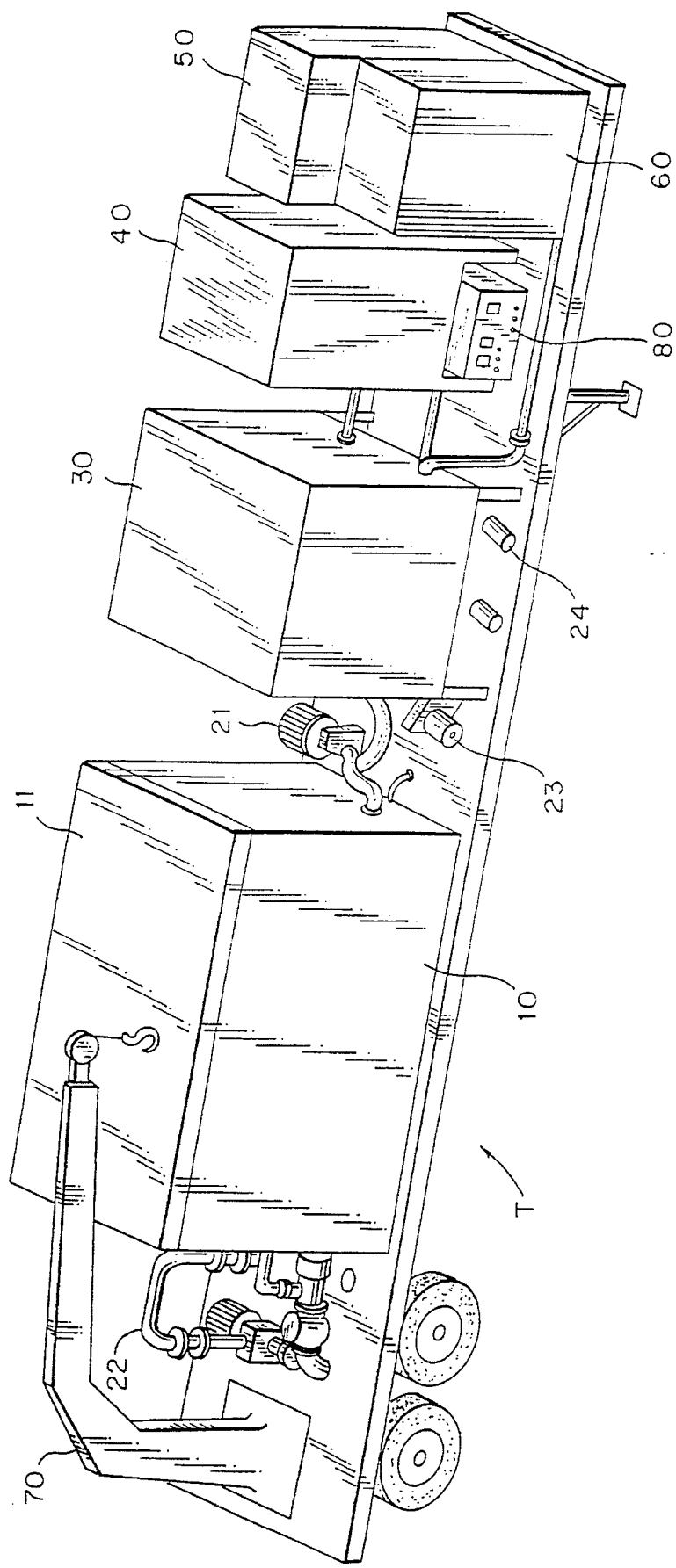
FIG. 1 is a perspective over-view of the system of the invention.

The invention is shown, somewhat schematically, in FIG. 1. A trailer T provides the portable mounting for the invention. Additional trailers (not shown) may be used also. At the end of the trailer T is mounted a conventional crane or hoist 70. A cleaning chamber 10 includes a gasketed lift-off or hinged cover 11. When the cover 11 is lifted, the crane 70 can place or remove objects from the inside of the chamber 10. Also on the trailer T, or on another trailer, are a detergent holding tank 30, a rinse water holding tank 40, a conditioning unit 50, a boiler 60, a control panel 80, and various pumps and interconnecting pipes.

The system operates under the control of the panel 80, which includes operating switches, programmable logic circuits for automated control of cleaning cycles, automatic tripping devices for safety, and other conventional control apparatus. In the manual mode, the main cleaning process steps of washing, spraying, and rinsing are separately started and stopped by manipulating switches on the control panel.

Before the system is started, contaminated debris is loaded into the chamber 10 and the cover 11 is placed on to close it. If small, the debris is loaded into a basket drum 200 (shown in FIG. 2) which is then placed into the chamber 10 by the crane 70; if too large for the basket drum 200, the pieces are individually placed into the chamber 10. In an alternative embodiment, a second large chamber may be provided especially for such large pieces.

Washing, in the present invention consists of immersing the debris in detergent and agitating the detergent for some time sufficient to clean the debris. The detergent is preferably a mixture of water and Bluegold BG5 detergent, a non-ionic surfactant, at 3–8% BG5 and a temperature of 140° to 160 ° F. The detergent is pumped, by pump 21, into the chamber 10 through electrically-activated motorized valves. Filling of the cleaning chamber 10 is controlled by a level sensor (not shown) so that pumping stops automatically when the chamber is full. Next the wash pump 22 is activated, pumping detergent solution into the chamber 10 to create turbulence to clean the debris.

Figure 2:
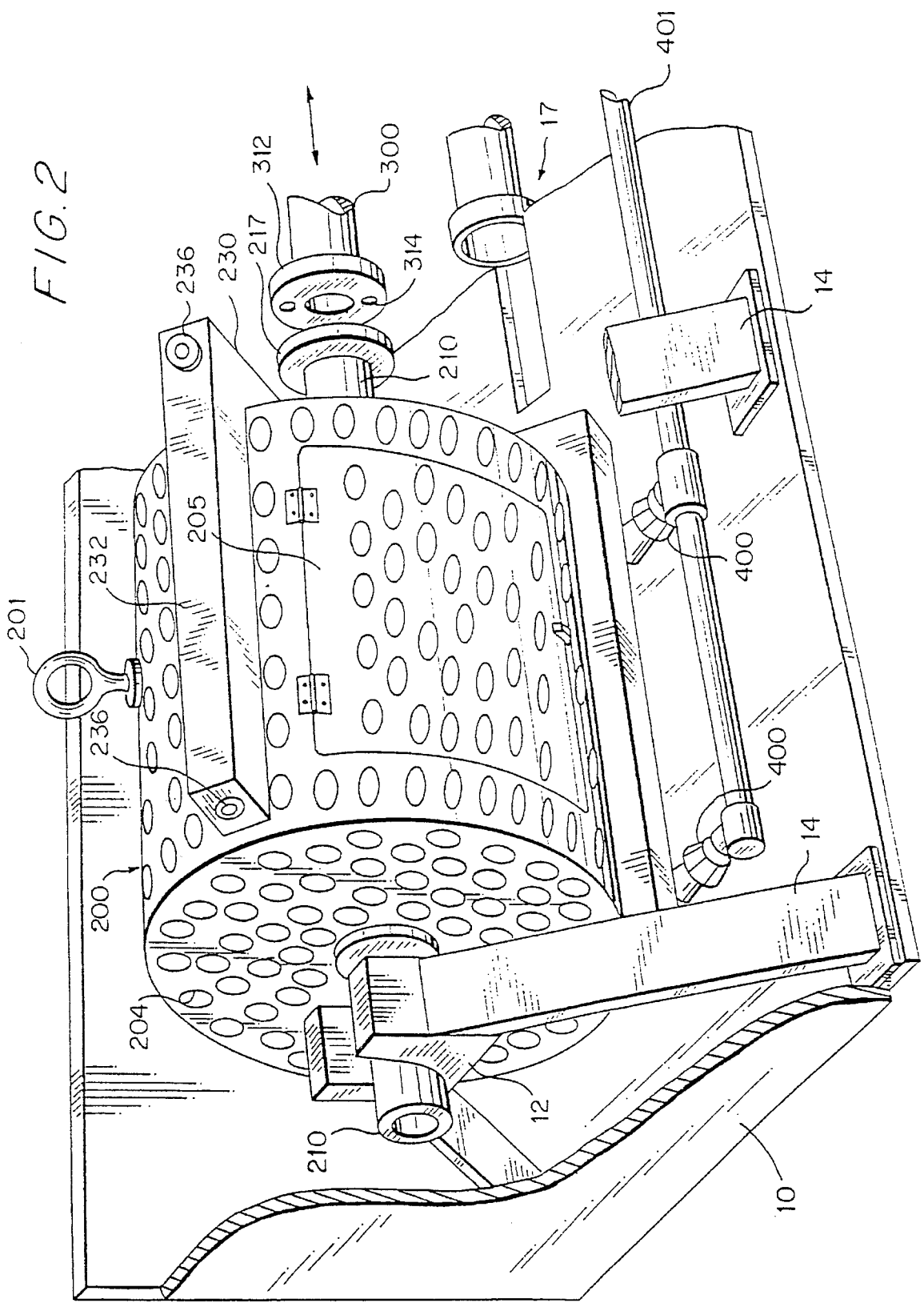
FIG. 2 is a perspective, partially cut-away view of the chamber and basket drum.

The basket drum 200, seen in FIG. 2, includes perforations 204 through which detergent can move to wash the debris inside the basket drum 200 when the drum is immersed in detergent and the detergent is agitated.

During the wash operation, pressure differential sensors positioned on in-line strainers in the delivery pipes will trigger sound alarms at the control panel 80 when strainers are clogged. Clogging cuts off liquid flow to a pump; running dry will destroy the pump.

At the end of the wash operation, return pump 23 transfers detergent back from the cleaning chamber 10 to the detergent tank 30. A liquid level switch (not shown) in the detergent tank 30 stops return pump when liquid reaches this level.

During washing, a trash pump is activated to pump 50 gal/min from the cleaning chamber to the water reconditioning system 50. During the spraying operation that comes after the washing operation, an oil/water separator pump 24 is activated to pump 50 gal/min from the detergent holding tank 30 into the oil/water separator of the unit 50 for reconditioning of the detergent.

Each of the tanks is equipped with liquid level sensors and transmitters which sound alarms and shut off pumps if liquid levels reach the stage where the pumps would run dry. During the process, thermocouples in the detergent tank 30 sense the water temperature and, if needed, the boiler 60 is automatically activated to maintain water at a desired temperature.

Soil present on debris will be removed and cleaned during this process. Soil suspended in the cleaning solution may be removed during water reconditioning, either prior to or after oil/water separation, by means of a settling basin, bag filters, or flocculation tank (not shown).

Organic contaminants may be removed by physical separation in the oil/water separator. Filtering and absorbing can be accomplished with carbon, diatomaceous earth, or resins. Dissolved metals may be removed by precipitation, ion exchange, chelation/extraction, or pH adjustment followed by filtration.

Flow rates during the washing and spraying operations are sensed by magnetic flow meters and digitally displayed on the control panel.

During the washing operation, it is important that the detergent be turbulent. The present invention uses circulating tank eductors to create turbulence. FIG. 2 shows the eductors 400 disposed around the inside of the chamber 10, mounted on a delivery pipe 401. Each eductor has a dual capability for functioning as a transfer pump while creating an intimate mixing action between the primary fluid (from the delivery pipe) and secondary fluid (already in the tank), which cannot be duplicated by mechanical devices. This feature is very effectively employed in keeping the liquid contents of tanks in constant motion.

Figure 4:
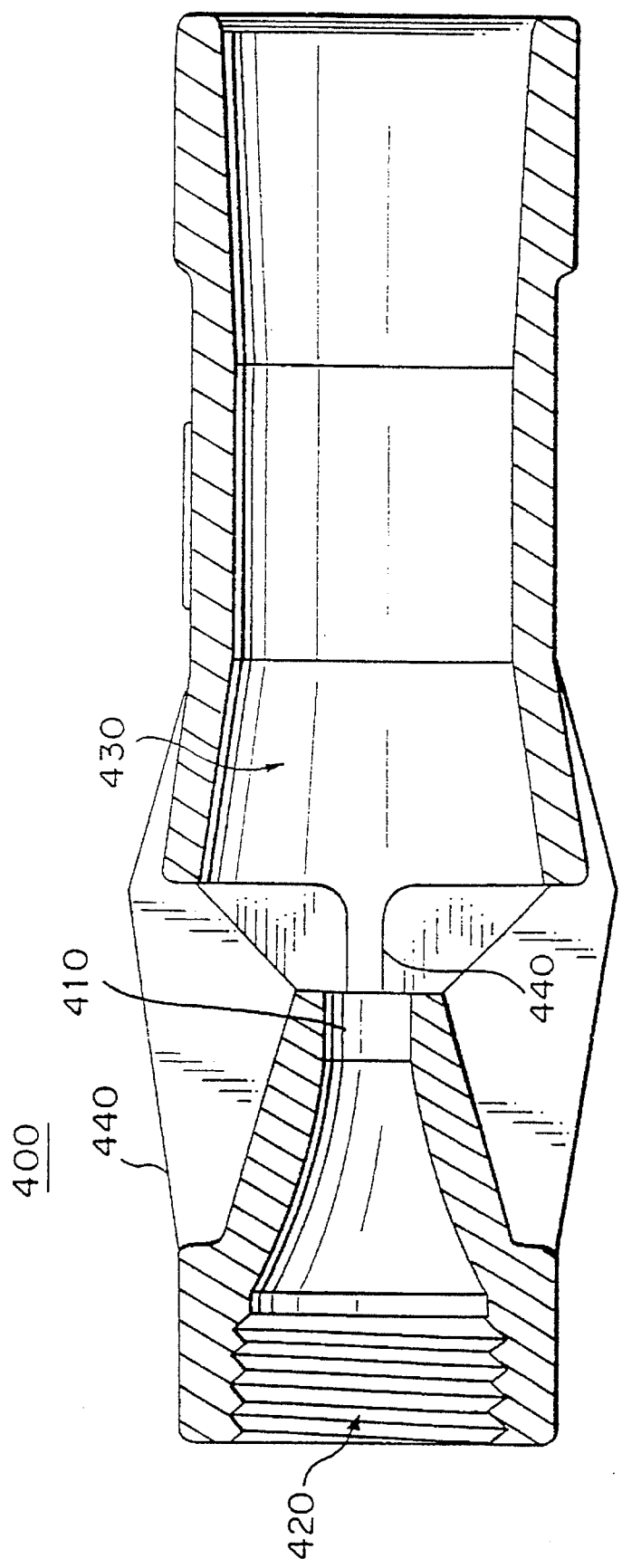
FIG. 4 is a cross-sectional view of an eductor.

A single eductor 400 is shown in cross section in FIG. 4. Each eductor 400 includes a high-velocity jet nozzle 410 fed directly from the delivery pipe 401 (not shown in FIG. 4) that fits into a collar 420, wherein it is welded or otherwise conventionally fastened. The converging jet nozzle 410, due to the pressure in the delivery pipe 401, forms a high-speed detergent jet flowing from the jet nozzle 410. The jet squirts a relatively low-volume, but high-speed stream of fluid into the venturi orifice 430, causing a pressure drop which entrains or sucks in secondary detergent surrounding the eductor 400. Detergent enters through openings formed by four ribs 440 that connect the collar 420 to the venturi 430, which is the combining or mixing tube section of the eductor 400. Eductors 400 are one piece castings.

The entrained ambient detergent multiplies the amount of detergent that is set into motion, creating turbulence without a need for large pumps, delivery pipes, and drains. In the first chamber six hundred gallons per minute of cleaning solution is pumped into a header (feeding pipe 401) located within the cleaning chamber, to which 18 circulating tank eductors are connected. When supplied with a differential pressure approximately 20 psi above the static pressure in the chamber, each gallon of detergent cleaning solution passing through one eductor is capable of circulating 3 gallons of secondary fluid. This results in an overall turnover rate of 4 times the capacity of the motivation pump capacity. The 18 circulating eductors in the cleaning chamber entrain a total of 2950 gallons per minute during a typical wash cycle.

The high rate of fluid flow made possible by the use of a relatively small pump in combination with the eductor 400 venturi devices provides the maximum possible insurance against settling out of suspended solids, separation of immiscible mixtures, and stratification of liquids having fractional specific gravity components. Thorough mixing also develops and maintains a uniform temperature of the cleaning solution. By the mixing action created by the eductors 400, soil will be very effectively suspended and at times may be fluidized (depending upon particle size). The soil is cleaned through attrition and detergent action. Debris inside the basket drum 200 will therefore be very effectively cleaned, even though the debris is enclosed in a perforated container.

After the washing operation, the detergent is pumped from the chamber 10 back into the detergent tank and detergent spraying is begun using spray and return pumps. Detergent, pressurized by a pump, is sprayed from nozzles onto the debris at high velocity in order to loosen stuck-on dirt. Pump 23 is the return pump, which drains the chamber 10 during the spray operation. FIG. 1 shows a drain opening 17 with a sloping section of the floor of the chamber 10.

In the second sort of chamber, used for large debris, several hundred spray nozzles are arrayed along the walls, floor, and ceiling of the chamber 10. The large cleaning chamber 10 has grates in the bottom, on which heavy pieces of debris can be placed. If the first sort of chamber is used such nozzles are ineffective because the basket drum 200, although its surface is perforated, would deflect most of the spray away from the debris. Instead, the basket drum 200 includes internal spray nozzles.

FIG. 2 shows the basket drum 200 inside the chamber 10, which has been partially cut away and is shown without its cover 11. The basket drum has a hinged 36"×42" door 205 and locking latch for loading and unloading debris. A lifting ear 201 is welded onto the basket drum to permit handling by a crane. The approximate weight (empty) of the basket drum is 1200 lbs. The basket drum is preferably 48" diameter and 48" long, made of ½" thick carbon steel, with 1" diameter holes on 1½" staggered centers.

Journal shafts 210 extend concentrically from either end of the drum 200. The shafts 210 allow the drum 200 to rotate in bearings 12, held up by bearing supports 14 that are fastened to the chamber 10 and support the weight of the basket drum 200. One of the journal shafts 210 has no end flange, and is merely for mechanical support; the other includes a clutch flange 212 that engages a driving disc 312 which turns to rotate the basket drum 200 in the bearings 12.

Figure 3:
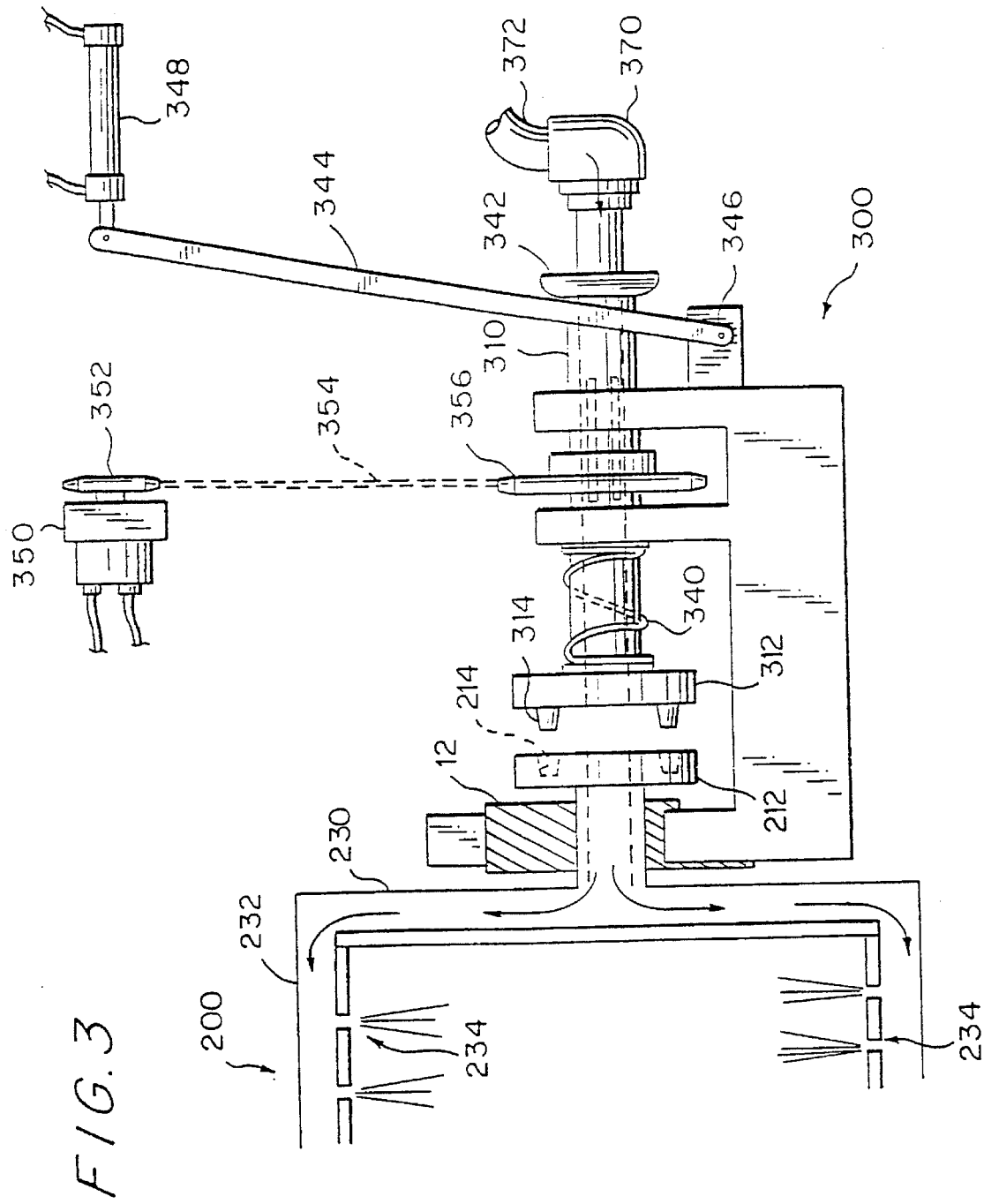
FIG. 3 is a schematic view of the fluid-sealing coupling and drive mechanism.

The clutch-side basket drum journal shaft is hollow. During the spray operation it is fed with pressurized detergent through a rotary joint (not shown in FIG. 2). The detergent passes through a manifold on the clutch end of the basket drum 200. As seen in FIGS. 2 and 3, the manifold comprises three radiating manifold tubes which internally communicate with the hollow interior of the clutch-side journal shaft, so that detergent can move directly into the manifold tubes 230. Each of the three tubes 230 communicates in turn with a respective header tube 232 which runs longitudinally along the exterior of the basket drum 200. The manifold tubes 230 and header tubes 232 are preferably formed of steel sheet bent into a U-shape and welded to the surface of the basket drum 200.

FIG. 3 shows that inside each header tube 232 the surface of the basket drum 200 is perforated by five hundred orifices 234 drilled through the ½" thick wall of the basket drum. Each 3/32" in diameter, these orifices 234 spray directly onto the debris. This provides complete, unobstructed spray impingement from three directions. The manifold and header tubes are designed to handle a minimum spraying pressure of 90 psi from any individual orifice when supplied at 500 gallons per minute. The manifold is equipped with pipe plugs 236 for cleaning.

Inside the chamber 10 is a hydraulically engaged and hydraulically driven clutch mechanism 300 which has the double function of turning the basket drum 200 during the cleaning process (both wash and spray) and delivering detergent or rinse water to the header tubes 232 during the spray and rinse operations.

FIG. 3 shows the clutch mechanism 300. The clutch flange 212 is also visible in FIG. 2; in FIG. 3 it is seen to include indentations 214 which mate with corresponding respective teeth 314 on driving disc 312.

Disc 312 is firmly attached at the end of pipe shaft 310, which in turn is fastened to large sprocket wheel 356. A hydraulic motor 350 drives the pipe shaft 310, at a maximum speed of 4 rpm, through a sprocket wheel 352, chain 354, and second sprocket wheel 356 mounted on the pipe shaft 310, which is larger than the sprocket wheel 352, so as to yield a 10:1 turndown ratio. The hydraulic fluid required for rotation is 24 gallons per minute at 1500 psi.

The rotation rate is controlled by a lever on panel. The clutch system is equipped with a safety mechanism which includes a cross-port relief valve (not shown) at the hydraulic motor 350 with an alarm to stop the basket drum rotation in the event that the basket drum rotation is stopped, either because of obstruction or because of mechanical failure. Audible and visual alarm indicators on the control panel are energized if there is a stoppage. The alarm system is such that, once silenced, the alarm will not reset until proper operation has been restored.

To engage and disengage the indentations 214 with the teeth 314 on driving disc 312, a spring 340 is disposed around the pipe shaft 310 which urges the driving disc 312 toward the clutch flange 212. To disengage the clutch, hydraulic fluid is sent to an actuator cylinder 348, whose piston is coupled to an arm 344 pivoted on a pin 346. The arm 344 bears against a throw-out bearing 342 mounted on the pipe shaft 310.

Sprocket wheel 356 is preferably splined to the pipe shaft 310 to allow the wheel 356 to slide back and forth as the pipe shaft 310 is engaged and disengaged. This avoids binding of the chain 354.

When the clutch is engaged, driving disc 312 and clutch flange 212 are pressed together by the spring coil 340. Gasket material (or other fluid sealing means) may be disposed between them to prevent leakage of detergent or rinse water which is delivered by the pipe shaft 310 into the journal shaft 210 of the basket drum 200, and thence through the manifold tubes 230, header tubes 232, and orifices 234 to spray the debris. The end of the pipe shaft distal the driving disc 312 has a rotary fluid coupling 370 that connects the pipe shaft 310 to a delivery pipe or hose 372.

The spray operation is started when the spray pump is activated to deliver detergent or rinse water to the spraying orifices 234; the return pump 23, which sucks fluid from the drain opening 17, is activated by a liquid level sensor internal to cleaning chamber. The flow rate of the return pump 23 is controlled by a second sensor which adjusts a motorized valve (not shown) in the return line.

The rinse operation proceeds in the same fashion as the spray operation except that water is drawn from the water tank 40 instead of the detergent tank 30.

The invention optionally has two chambers, a smaller first chamber for the basket drum and a larger second chamber for large debris pieces.

The larger spray chamber tank is approximately 24 ft long, 7 ft wide, and 7.5 ft high. The tank has a partition of ¼" thick plate which divides the tank into two compartments: one approximately 10 ft long, 7 ft wide, and 7.5 ft high that is used as the detergent holding tank during the cleaning process; and another which is approximately 14 ft long, 7 ft wide, and 7.5 ft high, which is the large cleaning chamber which includes spray orifices. The entire tank is fabricated of 3/16-inch mild steel and is coated on the interior with two coatings of high-build epoxy paint. The tank is welded watertight with gusset plates and stiffening members to maintain rigidity. The chamber has enough strength to permit placing large items (up to 10,000 lbs) into the chamber. The tank sides and top are covered with 2 inches of insulation which is covered with a 20-gauge galvanized steel. A removable walkway, railing, and ladder is provided around two sides of the tank.

The basket drum chamber 10 may also be built in one unit with the tank 30, if desired.

The chambers each have a sloped bottom to allow drainage to a 3-inch drain opening (17 in FIG. 2) and piping connection. Each chamber includes one or two hydraulically operated top covers or doors; these doors require approximately 5.0 gallons per minute hydraulic fluid at 1500 psi to operate in the large chamber. The large cleaning chamber is fitted with fifty flow eductors (entraining 3000 gallons per minute during submerged cleaning) and three hundred and twenty-five orifices for spraying, positioned on six sides of the chamber (including the hinged cover).

The operation of the entire system is controlled through the computerized master control panel 80. (The panel may also be located in an enclosed room on a second trailer.) The master control panel includes a programmable logic controller (PLC) with multiple input/output cards. The control panel has a series of illuminated on/off push buttons for various steps of the process, a series of alarm lights for indicating various unsafe conditions, circuit breakers, a transformer to deliver 120-volt power, a variety of indicator/controllers including flow, temperature, pressure, pH, and level. All push buttons and alarm lights are labelled in such manner that the function of each component can be easily ascertained. The operation of the entire system can be readily monitored from the master control panel by observing the visual displays which includes a lighted process and instrumentation diagram.

The invention can be operated manually (i.e., an operator switches to activate each step) or in semi-automated mode. For semi-automated operation, the operating parameters for the process can be programmed into the PLC of the control panel. Power is routed to the master control panel from an external power source such as a generator which should be capable of providing at least 500 amp, 3-phase 460 volts.

If two trailers T are used, the various instruments, sensors, pumps, and other electrical components on Trailer 1 are connected to a slave control panel mounted on Trailer 1. During the operation of the system, this slave control panel is controlled by the master control panel mounted on trailer 2 by means of a communication computer program.

For safe operation of the system, all critical alarm conditions of the process are provided with an audible and visual (red) alarm status and silence/acknowledgment push buttons on the control pane. The alarm system is designed such that if the alarm condition has not been alleviated after a specified time, the audible/visual alarms will again activate. The slave control panel on Trailer 1 is provided with termination points for 4–20 milliamp analog signals for the remote alarm indication and silence/acknowledgment.

All electrical components and control panels are NEMA 4 rated for the outdoor use and conform to requirement of the National Electrical Code, and the Standards of the National Electrical Manufacturers Association.

The foregoing description of the specific embodiments will so fully reveal the general nature of the invention that others can, by applying current knowledge, readily modify and/or adapt for various applications such specific embodiments, without departing from the generic concepts, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A portable washing apparatus comprising:

a first chamber, the chamber including an internal pair of open half-bearings each for accepting thereon a corresponding journal shaft;

a rotatable basket drum having a surface surrounding an interior space for containing objects to be cleaned, the surface including openings to the interior space, the basket drum having drum journal shafts extending from opposing ends of the basket drum;

basket drum rotation means for rotating the basket drum when the basket drum is in the first chamber and the journal shafts are in the bearings;

means for inserting and removing the basket drum from the first chamber;

a detergent system further comprising a storage detergent tank, a pump for supplying pressurized detergent to at least one-detergent eductor disposed within the chamber outside of the basket drum, the eductor having a venturi for entraining detergent from the chamber, a drain opening in the chamber, and detergent piping interconnecting the detergent tank, the pump, the drain opening, and the eductor; and a spray system further comprising orifices disposed on the surface of the drum and rotatable with the basket drum, a rotary fluid connection disposed between the pump and the orifices, spray piping interconnecting the pump and the orifices, and fluid-sealing clutch means for disconnecting the rotary fluid connection.

2. The apparatus according to claim 1, further comprising a rinse water tank and rinse water piping interconnecting the pump and the rinse water tank.

3. The apparatus according to claim 1, wherein the means for inserting and removing the basket drum from the first chamber includes a crane.

4. The apparatus according to claim 1, further comprising a wheeled transport vehicle on which the apparatus is mounted for transportation.

5. The apparatus according to claim 4, further comprising a crane for inserting and removing the basket drum from the first chamber.

6. The apparatus according to claim 1, further comprising a control panel with automatic control means.

7. The apparatus according to claim 1, wherein the eductor includes a nozzle concentric with the venturi and the venturi is open at two ends.

8. The apparatus according to claim 1, further comprising a second chamber without bearings, the second chamber including a spraying system disposed about an inside of the second chamber.

9. The apparatus according to claim 1, further comprising a boiler for heating detergent to between 140° F. and 160° F.

10. The apparatus according to claim 1, further comprising a detergent conditioner, the conditioner including units selected from the group consisting of an oil/water separator, a carbon filter, an ion exchange resin column, and a particulate filter.

11. The apparatus according to claim 1, further comprising a water rinse system, the rinse system including a rinse water holding tank.

* * * * *